(12) United States Patent
Ammar

(10) Patent No.: US 7,250,747 B1
(45) Date of Patent: *Jul. 31, 2007

(54) RADIOMETER MEASUREMENT LINEARIZATION SYSTEM AND METHOD

(75) Inventor: Danny F. Ammar, Windermere, FL (US)

(73) Assignee: Xytrans, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/301,298

(22) Filed: Dec. 12, 2005

(51) Int. Cl.
G01S 3/02 (2006.01)
(52) U.S. Cl. .................................................. 324/76.14
(58) Field of Classification Search ............. 324/76.14
See application file for complete search history.

(56) References Cited

U.S. PATENT DOCUMENTS

| | | | |
|---|---|---|---|
| 5,327,029 A * | 7/1994 | Ericson et al. ............. 327/350 |
| 6,054,900 A | 4/2000 | Ishida et al. ............... 330/286 |
| 6,424,223 B1 | 7/2002 | Wang et al. ............... 330/286 |
| 2005/0063447 A1 | 3/2005 | Ammar .......................... 374/1 |
| 2005/0122254 A1 | 6/2005 | Ammar ....................... 342/174 |

* cited by examiner

*Primary Examiner*—Anjan Deb
*Assistant Examiner*—Timothy J Dole
(74) *Attorney, Agent, or Firm*—Allen, Dyer, Doppelt, Milbrath & Gilchrist, P.A.

(57) ABSTRACT

A radiometer system includes a dual channel, quadrature hybrid amplifier circuit that receives an antenna signal and a known reference signal to equalize gain in two parallel gain stages. A detector circuit receives a signal from the quadrature hybrid amplifier circuit and detects the signals to form a detected output for eliminating sensitivity to gain variations, improving dynamic range of the input signal, and reducing calibration requirements. A log ratio amplifier receives and linearizes the detected output. An integrator circuit receives a signal from the log ratio amplifier and sums the signal over an observation.

20 Claims, 8 Drawing Sheets

RADIOMETER MEASUREMENT LINEARIZATION SYSTEM AND METHOD

FIELD OF THE INVENTION

This application relates to the field of radiometers, and more particularly, this invention relates to radiometers having improved sensor stability.

BACKGROUND OF THE INVENTION

Since radio waves may be considered infrared radiation of long wave, a hot body would be expected to radiate microwave energy thermally. In order to be a good radiator of microwave energy, a body should be a good absorber. An adequate thermal radiator is a "black body." The amount of radiation emitted in the Millimeter Wave (MMW) range is about $10^8$ times smaller than the amount emitted in the infrared range. Current MMW receivers, however, typically have at least $10^5$ times better noise performance than infrared detectors, and with some temperature contrast, the remaining $10^3$ may be recovered. This makes passive MMW imaging comparable in performance with current infrared systems, making MMW radiometers a popular choice for sensing thermal radiation. MMW radiometers have been used in many different applications such as remote terrestrial and extra-terrestrial sensing, medical diagnostics and defense applications. MMW electromagnetic radiation windows occur at 35 GHz, 94 GHz, 140 GHz and 220 GHz. The choice of frequency depends on specific applications.

Focal plane arrays are used to form images from radiation received by a reflector antenna. Millimeter wave focal plane array radiometers also have been used in many applications to form images based on thermal sensing of radiated microwave energy. The sensitivity of existing radiometer designs, however, has been limited to about 1 deg K., resulting in poor images.

The principle of operation of the radiometric technique is fully described in the literature. The design of a typical radiometer is based on the technique of comparing the level of electromagnetic noise emitted by an unknown source as a target to a reference or stable noise source. This technique and devices were initially proposed by Dicke [R. H. Dicke, "The Measurement of Thermal Radiation at Microwave Frequencies," The Review of Scientific Instruments, Vol. 17, No. 7, July 1946].

In a Dicke radiometer circuit, the signals from an antenna are sampled and compared with signals from a reference source maintained at a known constant temperature. This overcomes some of the problems of amplifier instability, but in general does not alter effects resulting from imperfect components and thermal gradients.

While other types of radiometric devices have been used with some success, the Dicke (or comparison) type of radiometer has been the most widely used for the study of relatively low level noise-like MMW signals, especially where the noise signals to be examined are often small in comparison to the internally generated noise level within the radiometer receiver. While there are several types of comparison radiometers, one popular type of radiometer for use in the microwave/millimeter wave frequency bands is that in which an incoming signal to be measured as a target and a standard or calibrated reference noise signal are compared. This type of radiometer compares the amplitude of an unknown noise signal coming from the source to be examined with a known amplitude of a noise signal from a calibration source, and has been found useful in measuring with considerable accuracy the effective temperature of an unknown source.

In the Dicke or comparison type radiometer, the receiver input is switched between the antenna and a local reference signal noise generator. The detected and amplified receiver output is coupled to a phase-sensing detector operated in synchronism with the input switching. The output signal from such a radiometer receiver is proportional to the difference between the temperature of the reference signal source and the temperature of the source viewed by the antenna inasmuch as the phase-sensing detector acts to subtract the background or internal noise of the receiver.

A Dicke radiometer uses an RF switch coupled between an antenna and a radiometer receiver, allowing the receiver to alternate between the antenna and a known reference load termination. The receiver output is connected to a synchronous detector that produces an output voltage proportional to a difference between the antenna and the reference temperature. Null balance operation for the Dicke radiometer has been achieved by coupling in noise from a hot noise diode to the antenna port of the RF switch thereby matching the temperature from standard reference loads.

The sensitivity of radiometer measurements are also often limited by random gain fluctuations in the RF front end, low frequency noise (1/f), and bias in the detector circuits. Over the last decades many special techniques, including Dicke switching, have been implemented to reduce measurement errors. Many of these proposals have not yielded a solution that will allow MMW radiometers to be commercially viable. Also, the high cost of MMW RF receivers has limited the number of channels in the radiometer to a low number, resulting in a requirement to scan both azimuth and elevation to create an image.

A challenging aspect of radiometer sensing is the ability to maintain stability over time and temperature. When multiple channel radiometer systems are used, channel-to-channel stability is a challenge. Some sensor characterization over temperature and digital compensation can occur through look-up tables, which have been used extensively to overcome the stability issues. This technique, however, is costly and requires hours of testing per unit. It is also a roadblock to proliferation of radiometer sensors for commercial applications. It would be advantageous to address sensor stability through linearization while eliminating any characterization to result in a more simple circuit design and lower cost.

SUMMARY OF THE INVENTION

A radiometer system in accordance with one non-limiting example of the present example includes a dual channel, quadrature hybrid amplifier circuit that receives an antenna signal and a known reference signal. A detector circuit receives a signal from the quadrature hybrid amplifier circuit to equalize gain in two parallel gain stages and detects the signals to form a detected output. A log ratio amplifier receives and linearizes the detected output for eliminating sensitivity to gain variations, improving dynamic range of the input signal, and reducing calibration requirements. An integrator circuit receives a signal from the log ratio amplifier and sums the signal over an observation period. A digital acquisition and processing circuit can receive a signal from the integrator circuit for further radiometer processing.

In yet another aspect of the present invention, the dual channel, quadrature hybrid amplifier circuit is formed as a monolithic microwave integrated circuit (MMIC). This MMIC can also be formed as an input quadrature hybrid having at least one radio frequency (RF) input and parallel signal path outputs. At least one amplifier can be connected in each signal path output and an output quadrature hybrid connected to each at least one amplifier and having parallel RF outputs. This MMIC can be formed to include the detector circuit.

In yet another aspect of the present invention, the detector circuit can be formed by at least one diode or a matched pair of diodes. The log ratio amplifier can output a voltage signal that is proportional to the log ratio of the target signal to the reference signal. This log ratio amplifier can also be formed by at least one operational amplifier and series resistors to convert the voltage to a current. The integrator circuit can also be formed by an operational amplifier.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As known to those skilled in the arts, absorbance and transmittance measurements are typically performed with a light source. Transmittance is the ratio of light intensity before and after it enters a medium. Absorbance is the logarithm of transmittance. Applying these two principles to a radiometer system in accordance with one non-limiting example of the present invention can result in robust radiometric sensing. Similar to optics, transmittance in radiometry, which is the ratio of the detected voltage from the antenna energy and the reference load, varies exponetially with the energy concentration. Absorbance in radiometery can be the log of transmittance as in optics. Once transformed into a log function, the radiometer measurements become linear and support a wide dynamic range. The linearity and wide dynamic range can make a radiometer sensor tolerant to wide variations, improve its performance, and reduce its cost.

In accordance with one non-limiting example of the present invention, a radiometer circuit operative typically in the W-band uses a dual channel, hybrid, low noise amplifier (LNA) circuit typically formed as a monolithic microwave integrated circuit (MMIC), a single or matched pair of detector diodes, a log ratio amplifier that linearizes the detector output, an integrator circuit, and digital acquisition and processing circuit. The dual channel LNA and any matched detector diode(s) permit continuous target sensing and makes the radiometer more sensitive (sometimes as much as twice as sensitive) as a Dicke radiometer, which time multiplexes target and reference sensing.

The linearization of the detector output and the use of ratio detection makes the radiometer insensitive to gain and temperature variations. Because of this circuit design, continuous channel-to-channel tracking is typically not required and channel-to-channel drift over temperature and gain variations typically do not impact the detected output. This type of radiometer system can be insensitive to wide gain variations (greater than 30 dB). Automatic gain control (AGC) is typically not required and the design eliminates sensor "zeroing," which is currently required by many multi-channel radiometers. Although the channel-to-channel gain may drift over time and temperature, the ratio of the target to reference is typically not effected.

Figure 1:
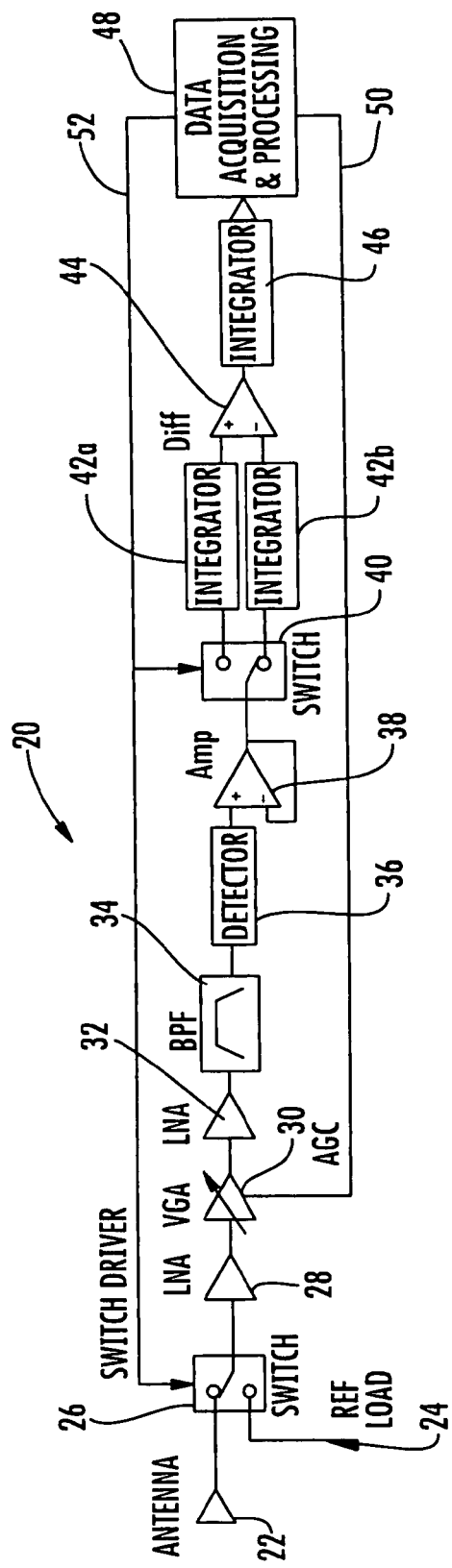
FIG. 1 is a schematic block diagram showing basic components of a typical radiometer system.

FIG. 1 is a block diagram of a typical radiometer system 20, including the receiver front end. As illustrated, this radiometer system 20 includes an antenna 22 and reference load 24 connected into a switch 26, typically configured as a Dicke switch of the type known to those skilled in the art. The output from the Dicke switch 26 is transferred to amplifiers 28, 30 and 32 typically formed as a MMIC amplifier circuit. A first low-noise amplifier (LNA) 28 is followed by a variable gain amplifier (VGA) 30, and followed again by a low-noise amplifier 32. A bandpass filter 34 receives the amplified signal, which is then detected in a square law detector 36 and amplified at amplifier 38 using appropriate feedback as necessary. The output from this amplifier 38 is output into the switch 40 and switches between integrators 42a and 42b that integrate the signals from the antenna and the reference separately. A difference amplifier 44 receives these signals, which is integrated in the integrator circuit 46. A data acquisition and processing circuit 48 receives the signal and transmits a) an automatic gain control (AGC) signal 50 to the variable gain amplifier 30, b) a switch driver signal 52 to the Dicke switch 26, and c) a radiometer output.

The antenna 22 senses target temperature, which is proportional to the radiated target energy. The energy passes through the Dicke switch 22 and into the series of MMIC amplifiers 28, 30 and 32. The bandpass filter 34 sets the receiver bandwidth. The square law detector 36 detects the signal and passes it to the switch 40 where the target and reference signals are separated and sent to integrators 42a and 42b. The output signals from the integrators form the inputs of a difference amplifier 44. The difference signal is integrated over the observation period within an integrator circuit 46, and digitized, compensated for temperature variation and processed for video display within the data acquisition and processing circuit 48.

In order to cancel the effects of gain variation, the Dicke switch 26 is used to sample a reference source. Gain variations in the receiver are cancelled using the reference load 24. Automatic gain control (AGC) may be used to minimize the gain variation over temperature and reduce the detection window in a manner similar to the circuit function as disclosed in copending and commonly assigned U.S. patent application Ser. No. 11/176,467 filed Jul. 7, 2005, the disclosure which is hereby incorporated by reference in its entirely.

Figure 2:
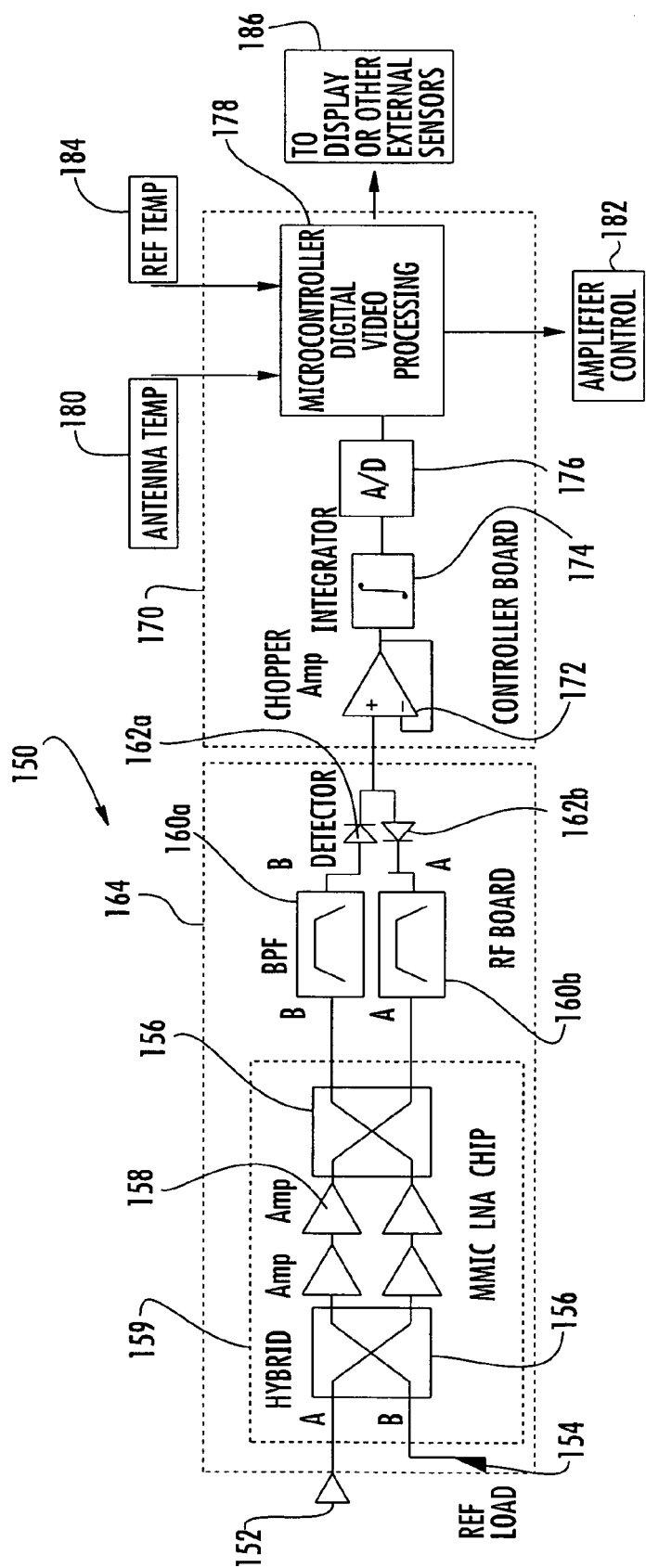
FIG. 2 is a block diagram showing basics components of a hybrid radiometer system.

FIG. 2 is a block diagram of a hybrid radiometer circuit 150 such as disclosed in copending and commonly assigned U.S. Patent Application Publication Nos. 2005/0063447 and 2005/0122254, the disclosures which are hereby incorporated by reference in their entirety. A radiator 152 as an antenna, for example, provides a first signal input "A" while a reference 154 provides a second signal input "B". The radiator 152 may be formed as many different types of radiator elements used in radiometers, including the antenna.

Microstrip quadrature hybrid circuits 156 are operable with low-noise amplifier circuit 158, disclosed together as a MMIC LNA chip 159 with parallel connected pairs of series connected low-noise amplifiers 158. The hybrid circuits can be 90-degree hybrids and include an input quadrature hybrid and output quadrature hybrid. There are two parallel gain stages and the quadrature hybrid and amplifiers are used to equalize gain in two parallel gain stages. Bandpass filter circuits 160a, 160b receive the signals represented at "A" and "B", which are output to detector circuits 162a, 162b, which could be part of the MMIC. These components are typically mounted on an RF board indicated by the dashed lines at 164. The RF board is typically formed from a single soft board of ceramic material in one non-limiting example. All MMW microstrip circuits, for example, 50 ohm lines, filters, hybrids and RF radiators can be printed on this board. Any MMIC chips can be attached directly to the board, or through cutouts, on a carrier plate underneath to the RF board in another non-limiting example.

The signals ("A" and "B") are output to a controller board indicated by a dashed line at 170, although only one board could be used and combined with the RF board. On this board occurs any necessary video signal amplification, digitization and conditioning, automatic RF amplifier biased adjustments, and DC power regulation. This board 170 can interface directly with a video display system. In this non-limiting example, the signal is received at a chopper amplifier circuit 172, which could be formed in some embodiments as dual chopper amplifier circuits for parallel signal paths. After amplification, the signal is integrated at an integrator circuit 174, which could be formed as dual integrator circuits, digitized at the analog/digital (A/D) circuit 176, which could be formed as dual A/D circuits for parallel signal paths.

A microcontroller circuit 178 provides digital video processing and receives an antenna temperature signal 180, transmits an amplifier control signal 182, and receives a reference temperature signal 184. The output from the microcontroller circuit 178 is sent to a display or other external sensors 186. This radiometer 150 can use the quadrature hybrid circuits 156 to distribute the reference power signal to the balanced amplifier chain as illustrated. The pairs of low noise amplifiers (LNAs) 158 are cross-coupled to each other, similar to a conventional balanced amplifier configuration. This radiometer design does not use a Dicke switch and delivers superior sensitivity and is easily implemented.

This radiometer 150 uses the quadrature hybrid LNA circuit to distribute the signal and reference power signals to balanced amplifier chains. The two inputs A and B are divided equally between both amplifiers and reconstructed at the output. Because each signal passes through each amplifier in the chain, any fluctuation in the gain of any of the amplifiers would be applied equally to both signals ($T_A$ & $T_{Ref}$).

Figure 3:
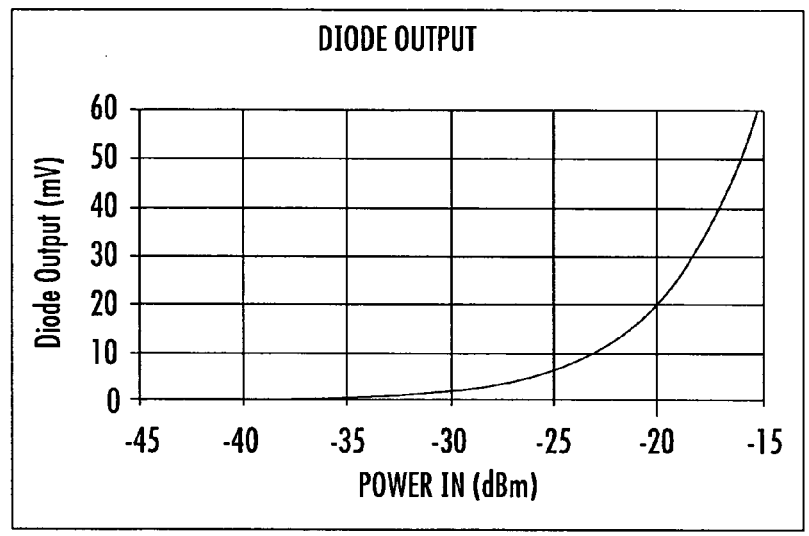
FIG. 3 is a graph showing a detector diode output in millivolts vs. the power input.

FIG. 3 is a graph showing a typical detector diode output voltage versus input power. As expected, the output voltage is exponential. Small variations in input power results in large variations in the detector output as shown by the diode output (mV) relative to the Power input (dBm).

Figure 4:
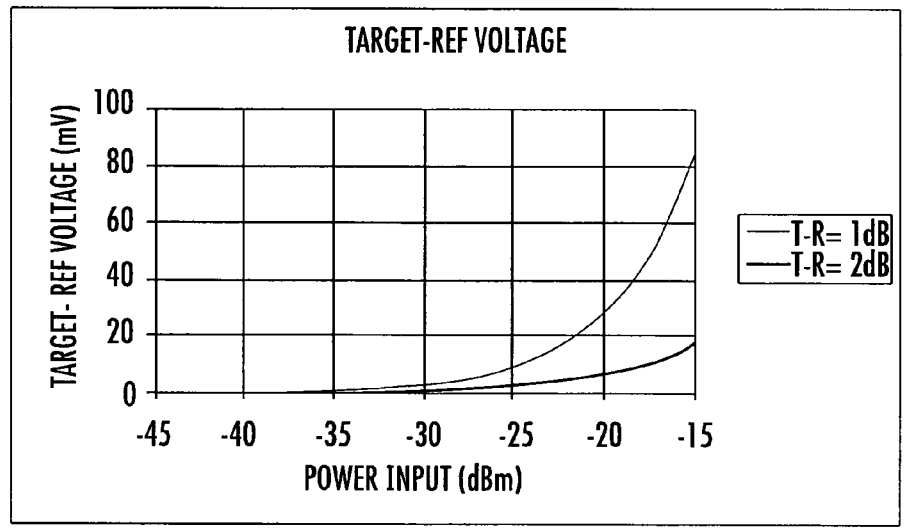
FIG. 4 is a graph showing the target reference voltage versus the power input.

As explained previously with reference to FIG. 1, the detected power from the antenna 22 and the reference load 24 are subtracted from each other within the difference amplifier 44 to form the radiometer output. FIG. 4 is a graph showing the output voltage of the difference amplifier for the case where a target signal is 1 dB higher than the reference, and a second case where a difference of 2 dB exists between the target and the reference. The non-linearity of the detector output causes the difference between the target and the reference signals to be non-linear also. This non-linearity makes it difficult to characterize and correct the sensor over temperature and channel-to-channel drift. A large number of characterization data points typically must be collected and stored in memory such as an EEPROM to correct accurately for any variations. Even with an antenna gain control (AGC) function to reduce the gain variation, extensive data collection, and a use of large look-up tables, the residual errors after corrections could be significant.

A circuit in accordance with one non-limiting example of the present invention applies absorbance and transmittance measurement in a radiometer system. As is understood by many skilled in the art, absorbance measurements are typically performed with a light source and are defined as:

$$A_\lambda = -\log_{10}(I/I_0),$$

where I is the intensity of light at a specified wavelength λ that has passed through a sample (transmitted light intensity) and $I_0$ is the intensity of the light before it enters the sample (or incident light intensity). The absorbance of a sample is proportional to the thickness of the sample and the concentration of the absorbing species in the sample. Transmittance ($I/I_0$) of a sample varies exponentially with thickness and concentration.

Applying these two principles to a radiometer system yields a robust system for radiometric sensing. Similar to optics, transmittance in radiometery ($V_A/V_{ref}$), which is the ratio of the detected voltage from the antenna energy and the reference load, varies exponetially with the energy concentration. Absorbance in radiometry is the log of transmittance as in the case of optics.

Figure 5A:
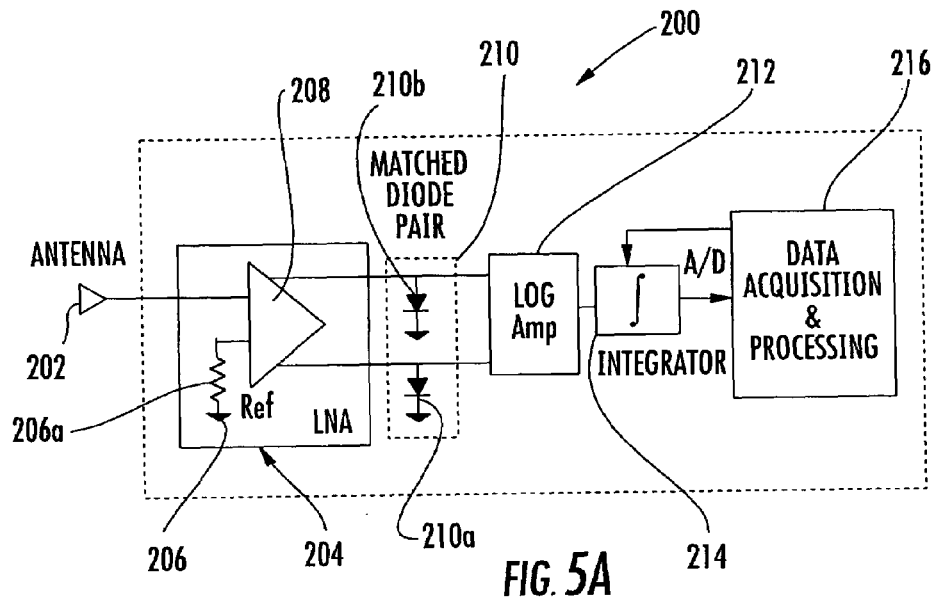
FIG. 5A is a block diagram showing basic components of a radiometer system in accordance with one non-limiting example of the present invention and using a matched pair of diodes for a detector circuit.

FIG. 5A is a block diagram showing basic components of a radiometer system 200 in accordance with one non-limiting example of the current invention. As illustrated, the radiometer system 200 includes an antenna 202 and low noise amplifier circuit 204. A reference 206 is grounded with a resistor 206a and low noise amplifier circuit 208 is formed such as by a plurality of dual channel, series connected as described before. Signals are sent into a detector circuit 210, which could include a matched diode pair 210a, 210b, and into a log ratio amplifier 212 in one non-limiting example. Signals from the log ratio amplifier are integrated within an integrator 214 and processed in the data acquisition and processing circuit 216 and fed back into the integrator as feedback and control signals as illustrated.

Figure 5B:
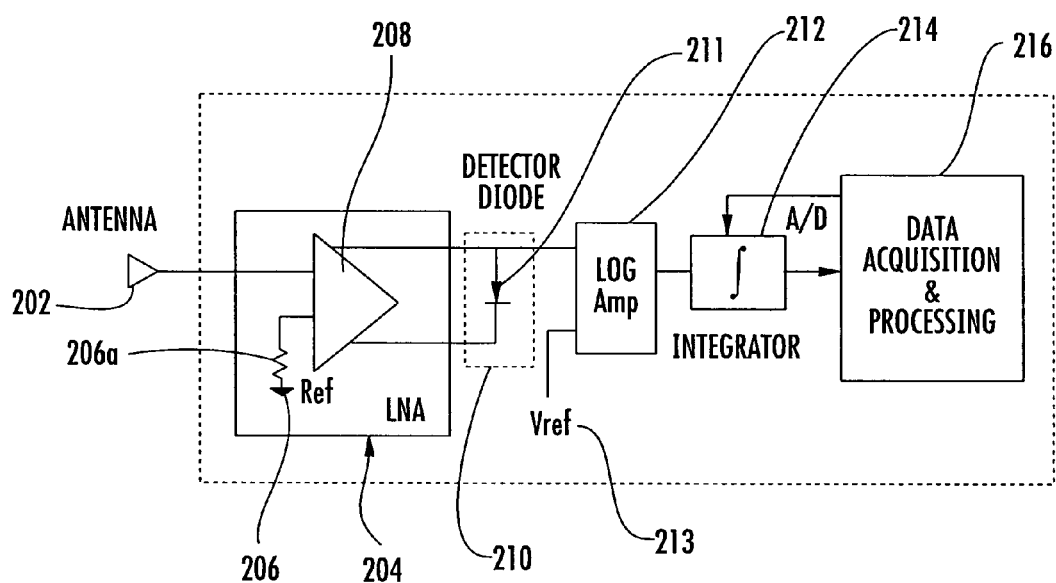
FIG. 5B is another block diagram showing basic components of a radiometer system similar to the radiometer system shown in FIG. 5A, but showing a single diode configuration for the detector circuit.

FIG. 5B illustrates another embodiment in which the pair of matched diodes 210a and 210b are replaced by a single detector diode 211 and one of the log ratio amplifier inputs is replaced by a reference voltage 213. This embodiment can provide higher stability in some instances as the signal from both the antenna 202 and the reference 206 are detected by a single diode 211.

In FIG. 5A, signals from the antenna 202 and the reference load 206 pass through the hybrid LNA circuit 204 (which could be similar in design to that circuit shown in FIG. 2) and into the matched pair of detector diodes 210a and 210b. The detected signals are sent to the log ratio amplifier 212, which supplies an output voltage (absorbance), which is proportional to the log ratio of the target to the reference signal. The output of the log ratio amplifier 212 is sent to the integrator 214 to sum the signal over the desired observation period. The signal is digitized using an A/D converter (not illustrated), and formatted for video display or other output to external functions using the data acquisition and processing circuitry 216.

Figure 6A:
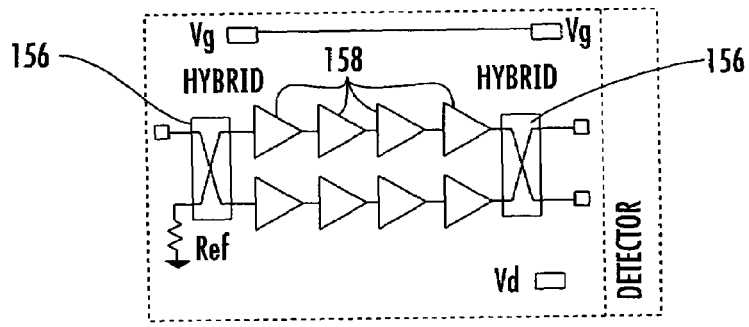
FIG. 6A is a block diagram showing basic components of a single-chip low noise amplifier (LNA) circuit formed as a monolithic microwave integrated circuit (MMIC).
Figure 6B:
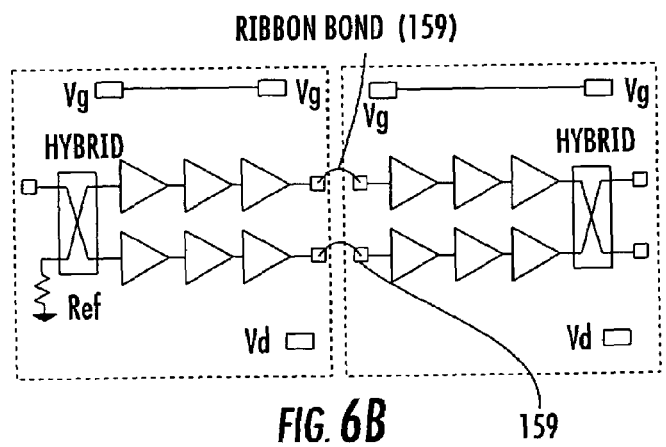
FIG. 6B is a block diagram showing basic components of a dual-chip, low noise amplifier (LNA) circuit formed by two MMICs.

As previously disclosed in the commonly assigned and incorporated by reference U.S. Patent Application Publication Nos. 2005/0063447 and 2005/0122254, the LNA circuit is designed as a hybrid LNA with dual inputs and outputs as shown in FIGS. 6A and 6B. There are many different variations of this LNA configuration and, FIGS. 6A and 6B show two such variations: the single MMIC chip version (FIG. 6A), and the dual chip version with two chips each having amplifiers 158 connected via ribbon bonds 159. The MMIC chip could include a detector circuit on the chip as illustrated in FIG. 6A. Each chip could include an input quadrature hybrid 156, with two outputs, series connected amplifiers on an quadrature hybrid.

In the circuit of FIG. 5A, the outputs of the hybrid LNA 204 are connected to matched pair of square-law detector diodes 162a and 162b, preferably zero bias diodes. The matching of the diodes can be accomplished during wafer testing. The outputs of the diodes 210a and 210b are fed into the precision logarithmic ratio amplifier 212, for example, the type of amplifier typically made by Texas Instruments. This log ratio amplifier aids in eliminating sensitivity to gain variations, improving the dynamic range of the input signal, and reducing calibration.

Figure 7:
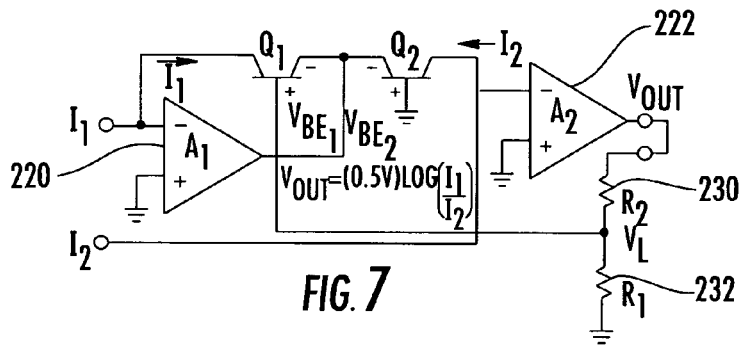
FIG. 7 is a schematic circuit diagram of a log amplifier that can be used with the radiometer systems shown in FIGS. 5A and 5B, in accordance with one non-limiting example of the present invention.
Figure 8A:
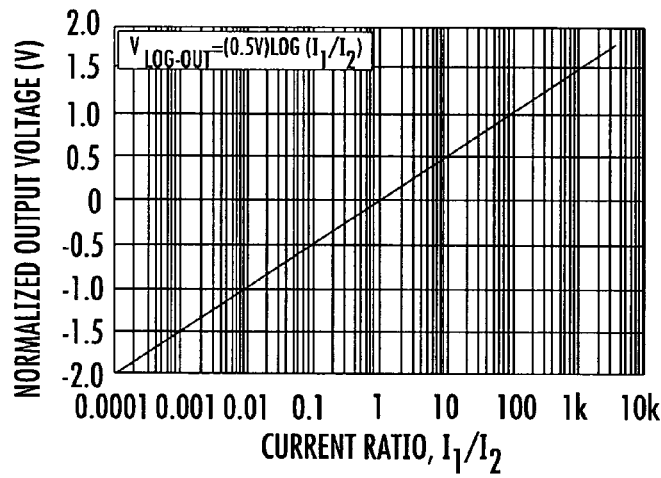
FIG. 8A is a graph showing the output voltage characteristic of a log ratio amplifier for a normalized transfer function in accordance with one non-limiting example of the present invention.
Figure 8B:
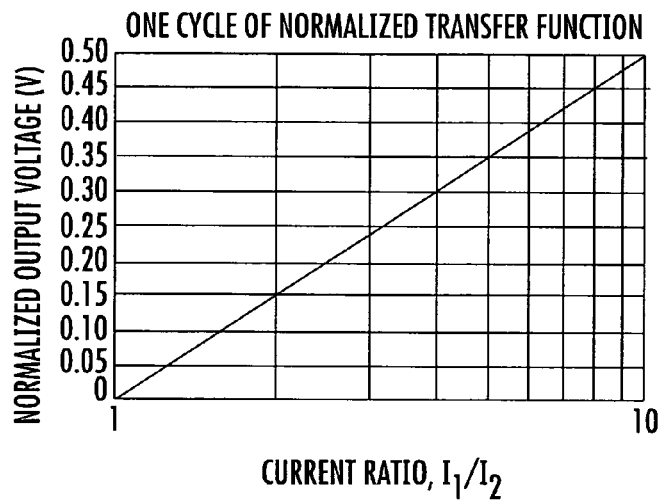
FIG. 8B is a graph showing the output voltage characteristic of a log ratio amplifier for one cycle of a normalized transfer function in accordance with one non-limiting example of the present invention.
Figure 9:
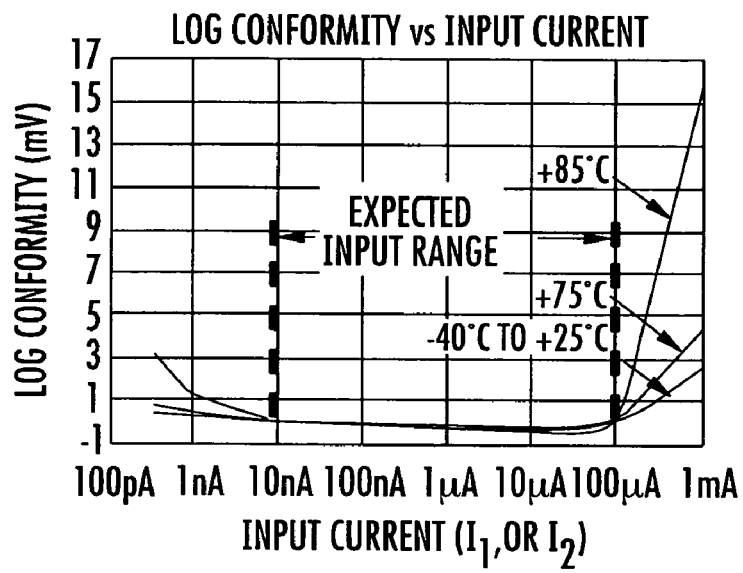
FIG. 9 is a graph showing a log conformity versus an input current in accordance with one non-limiting example of the present invention.

FIG. 7 is a non-limiting example of a simplified block diagram of a log amplifier 212 that can be used in the present invention. Further information of such an amplifier circuit can be found in the Texas Instruments' datasheets for logarithmic (log) ratio amplifiers. FIGS. 8A, 8B and 9 can be referenced to such datasheets. Two amplifiers 220, 222 are connected through transistors Q1, Q2, which could be mirrored or emitter connected to each other and biased as illustrated and an output from the second amplifier 222 connected to ground and into the base of Q1 through resistor divider network formed by two resistor R2 230 and R1 232. $I_1$ and $I_2$ are input currents.

The amplifier output is equal to $(0.5V) Log(I1/I2)$, where $I_1$ and $I_2$ are input currents. Since the output of the detector diodes are voltages, series resistors are typically used to covert them to current.

An example of the output voltage characteristic of the Log ratio amplifier is shown in FIGS. 8A and 8B. With a very wide input dynamic range (over six decades), this amplifier will maintain a constant voltage output even as the LNA gain will vary over temperature. FIG. 8A shows a normalized transfer function and FIG. 8B shows one cycle of the normalized transfer function.

FIG. 9 is a graph showing an example of the log conformity of this amplifier 212 with varying input current and temperature. Over the expected input range the amplifier shows no variation over temperature.

Figure 10:
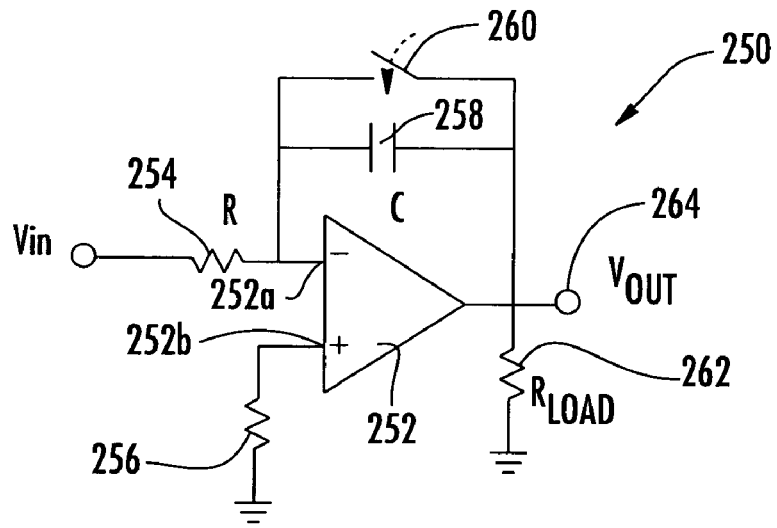
FIG. 10 is a schematic circuit diagram of a integrator circuit that can be used in the radiometer system such as shown in FIGS. 5A and 5B in accordance with one non-limiting example of the present invention.

Any log amplifiers used in this design typically have built-in operation amplifiers as illustrated in FIG. 7 to amplify and scale properly the output voltage Vo. Any operational amplifier can also be used to create an integrator such as shown in FIG. 10, which could be used also for an integrator as shown in FIG. 5A.

As illustrated, the integrator 250 includes an operational amplifier 252 with appropriate inputs 252a and 252b, each input connected to the appropriate resistor 254 and 256 with one connected to ground, as illustrated. An output signal is fedback through a capacitor 258 and switch 260 as illustrated. The load is shown as the resistor load 262 and the output at 264.

Figure 11:
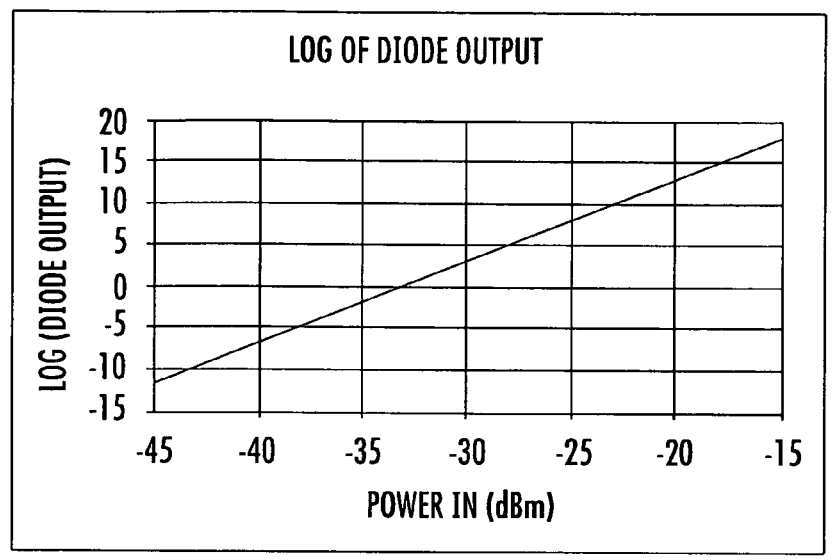
FIG. 11 is a graph showing the log of the diode output versus power input in accordance with one non-limiting example of the present invention.

FIG. 11 is a graph showing the log of the detector diode output. As can be seen in this graph, the log of the detector output is highly linear. This linearity makes the radiometer circuit simple to operate anywhere in the detector range and to implement compensation and corrections.

Figure 12:
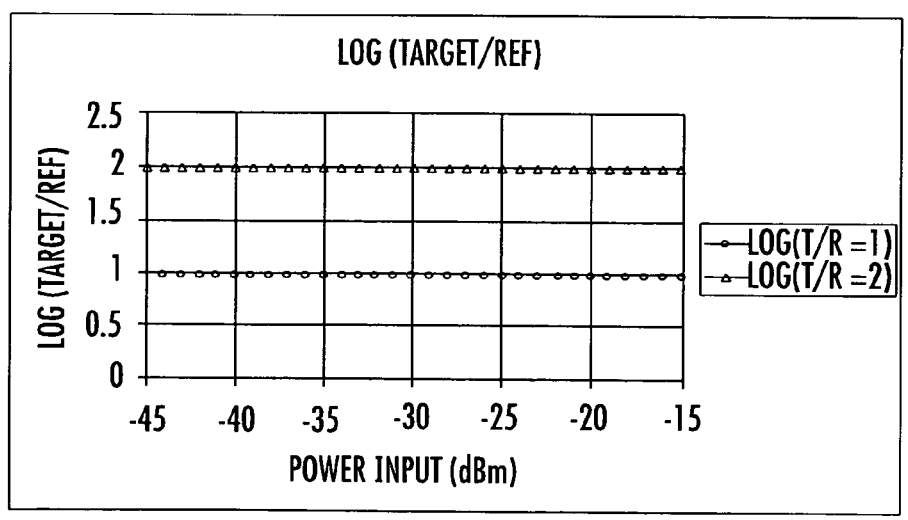
FIG. 12 is graph showing the log for the target/reference versus the power input in accordance with a non-limiting example of the present invention.

FIG. 12 is a graph showing the log of the target to the reference diode output voltage for the same two cases previously shown. In one case the target input power is 1 dB higher than the reference and in the second case the target input is 2 dB higher than the reference. As long as the input power is within the detector's range, the output of the log ratio amplifier is independent of the input power level or gain.

The log ratio detection solves two of the major issues of current radiometers: 1) gain variation and 2) wide dynamic range. The detector diode and the log ratio amplifier have over 30 dB of input dynamic range. A typical radiometer system with 40 dB gain is not expected to vary in gain by more than 10 to 15 dB over temperature and time. Therefore, no AGC will be required. The insensitivity of this design to gain variation is easily demonstrated.

Assuming a square law detector, the output voltage consists of an average value of the radiometer output noise power. The output voltage is:

$$V_{out} = Psys \times Gsys$$

where Gsys is the receiver gain and Psys is the total input power.

The gain variation effects on the sensitivity of a typical Dicke radiometer is given by:

$$\Delta T_G = (T_A - T_{ref}) \times (\Delta Gsys/Gsys)$$

where $T_A$ is the antenna temperature, $T_{ref}$ is the reference temperature, and $\Delta Gsys$ is the change in system gain between the antenna and reference measurements.

In the embodiment described, there is little gain difference between the antenna and the reference because the measurements are taken simultaneously. The gain ratio term goes to 1 and effectively drops out of the equation. The exact expression for this invention radiometer sensitivity is:

$$\Delta T = (1/\sqrt{B\tau}) T_{sys}$$

B is the system bandwidth, T is the integration time and $T_{sys}$ is the system temperature. The factory characterization typically needed for this circuit is required with multiple channel radiometers. To align all the channels relative to each other, an RF absorber is placed in front of the feedhorns and the output of each integrator is recorded. This value represents a "zero" value for that channel. The sensor temperature does not need to be set to any particular value during this measurement. Also, no additional zeroing will be required in the field.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radiometer system comprising:
   a dual channel, quadrature hybrid amplifier circuit that receives an antenna signal and a known reference signal to equalize gain in two parallel gain stages;
   a detector circuit that receives a signal from the quadrature hybrid amplifier circuit and detects the signals to form a detected output;
   a log ratio amplifier that receives and linearizes the detected output for eliminating sensitivity to gain variations, improving dynamic range of the input signal, and reducing calibration requirements; and
   an integrator circuit that receives a signal from the log ratio amplifier and sums the signal over an observation period.

2. A radiometer system according to claim 1, and further comprising a digital acquisition and processing circuit that receives a signal from the integrator circuit for further radiometer processing.

3. A radiometer system according to claim 1, wherein said dual channel, quadrature hybrid amplifier circuit comprises a monolithic microwave integrated circuit (MMIC).

4. A radiometer system according to claim 3, wherein said MMIC comprises an input quadrature hybrid having at least one radio frequency (RF) input and parallel signal path outputs, at least one amplifier connected in each signal path output of the quadrature hybrid, and an output quadrature hybrid connected at the amplifier and having parallel RF outputs.

5. A radiometer system according to claim 1, wherein said dual channel, quadrature hybrid amplifier circuit and said detector circuit comprise a monolithic microwave integrated circuit (MMIC).

6. A radiometer system according to claim 1, wherein said detector circuit comprises at least one diode.

7. A radiometer system according to claim 1, wherein said detector circuit comprises a matched pair of diodes.

8. A radiometer system according to claim 1, wherein said log ratio amplifier outputs a voltage signal that is proportional to the log ratio of the antenna signal to the known reference signal.

9. A radiometer system according to claim 1, wherein said log ratio amplifier comprises at least one operational amplifier and series resistors to convert the voltage to a current.

10. A radiometer system according to claim 1, wherein said integrator circuit comprises an operational amplifier.

11. A radiometer system comprising:
    a dual channel, quadrature hybrid amplifier circuit formed from an output and input quadrature hybrid and two parallel paths of series connected amplifiers connected therebetween, said quadrature hybrid amplifier circuit receiving an antenna signal and a known reference signal and having two outputs at the output quadrature hybrid;
    a diode connected across the outputs of the output quadrature hybrid that detects the signals to form a detected output;
    a log ratio amplifier connected to the detected output and a reference voltage that receives and linearizes the detected output for eliminating sensitivity to gain variations, improving dynamic range of the input signal, and reducing calibration requirements; and
    an integrator circuit that receives a signal from the log ratio amplifier and sums the signal over an observation period.

12. A radiometer system according to claim 11, and further comprising a digital acquisition and processing circuit that receives a signal from the integrator circuit for further radiometer processing.

13. A radiometer system according to claim 11, wherein said dual channel, quadrature hybrid amplifier circuit comprises a monolithic microwave integrated circuit (MMIC).

14. A radiometer system according to claim 11, wherein said dual channel, quadrature hybrid amplifier circuit and said diode comprise a monolithic microwave integrated circuit (MMIC).

15. A radiometer system according to claim 11, wherein said log ratio amplifier outputs a voltage signal that is proportional to the log ratio of the antenna signal to the known reference signal.

16. A radiometer system according to claim 11, wherein said log ratio amplifier comprises at least one operational amplifier and series resistors to convert the voltage to a current.

17. A radiometer system according to claim 11, wherein said integrator circuit comprises an operational amplifier.

18. A method of operating a radiometer, which comprises:
    receiving an antenna signal and a known reference signal within a dual channel, quadrature hybrid amplifier circuit for equalizing gain in two parallel gain stages;
    detecting the signal from the quadrature hybrid amplifier circuit and forming a detected output;
    receiving and linearizing the detected output within a log ratio amplifier for eliminating sensitivity to gain variations, improving dynamic range of the input signal, and reducing calibration requirements; and
    summing the signals over an observation period.

19. A method according to claim 18, which further comprises outputting a voltage signal from the log ratio amplifier that is proportional to the log ratio of the antenna signal to the known reference signal.

20. A method according to claim 18, and further comprising detecting the signal using a single diode or a pair of matched diodes.

* * * * *